Feb. 17, 1970     J. MERLE     3,495,792
ADJUSTMENT ARRANGEMENTS FOR AIRCRAFT BRAKING SYSTEMS ON RUNWAYS
Filed May 9, 1967     2 Sheets-Sheet 1

INVENTOR
JEAN MERLE
BY
ATTORNEY

# 3,495,792
ADJUSTMENT ARRANGEMENTS FOR AIRCRAFT BRAKING SYSTEMS ON RUNWAYS

Jean Merle, 1 Place du Commandant Nal, La Tronche, France
Filed May 9, 1967, Ser. No. 637,224
Claims priority, application France, May 9, 1966, 4,933
Int. Cl. B64c 25/42
U.S. Cl. 244—110      4 Claims

ABSTRACT OF THE DISCLOSURE

This invention relates to a braking system for slowing down aircraft on a runway and comprising a rotary fluid brake having screens for modifying its braking power, and means for automatically controlling the operation of such screens in accordance with the position of the aircraft on the runway, such means comprising movable cam means the movements of which correspond with the movements of the brake rotor and means coupling such cam means to mechanism associated with the screens for controlling their operation.

---

Rotary brakes having a torque which is variable as a function of their speed of rotation (for example, fluid brakes and eddy-current brakes) provide an advantageous solution for the equipment of arrester barriers for aircraft.

However, in the layout of a conventional installation such as shown in FIG. 1, in which two fluid-brake assemblies 1 arranged on each side of the runway are coupled to the aircraft 2 by a cable or net 3, the kinematic coupling line thus established between the aircraft and the brakes, and also the quadratic characteristic of the braking torque generated by the brakes, result in a braking action on the aircraft which differs substantially from an ideal braking at constant deceleration.

The spiral winding of the braking belt enables this braking effect to be improved to a certain extent, and it is then possible to obtain, for example, a law of deceleration corresponding to that shown by the curve A of FIG. 2, in which the values $\gamma$ of deceleration are plotted in ordinates and the successive positions $x$ of the aircraft are plotted in abscissae, the line CD being the ideal braking curve at constant deceleration.

This braking law can be still further improved by following the arrangements disclosed in French Patent No. 1,439,854 of Sept. 29, 1964 in the name of the present applicants and of the Societe Francaise Aeronautique Maritime for "Improvements in braking devices, especially for aircraft" by means of a belt-winding drum with a radius which varies following a pre-determined law, or again by means of a winding belt of variable thickness and in this case it is possible to obtain, for example, an improved deceleration curve A' which is however still quite different from the ideal curve CD with constant deceleration.

The present invention has for its object a method which can be applied alone or in combination with the above arrangements in order to bring the braking effect closer to braking at constant deceleration, utilizing simple and robust apparatus, essentially characterized in that action is automatically taken on the coefficient of braking (K) of the brakes, following a law which is a function of the position of the aircraft on the runway, so as to obtain a braking force (F) which is as constant as possible and has a determined value corresponding to a law of deceleration which approaches to the maximum extent the desired constant deceleration.

It is known that, for a fluid brake, it is possible to act very effectively with a very short response time on the braking coefficient, and in consequence on the braking power, by means of screens having variable positions and intercepting more or less of the fluid flow between the stator and the rotor.

The braking coefficient $(k)$ of a fluid brake can be written: $k = C/\omega$, where C is the braking torque and $\omega$ is the angular speed of the brake.

Under these conditions, the regulation of the value of the braking coefficient $(k)$ is effected according to the invention by coupling the regulating screens of the brake, by mechanical, hydraulic or electrical means, to members the position of which is a function of the travel of the aircraft along the runway, so that to each position of the aircraft there corresponds a single position of the said screens and a single value of the braking coefficient, following a pre-determined law K(x).

In practice, in order to design a braking installation according to the invention, the procedure is as follows:

Starting from the parameters which determine the geometric shape of the barrier; for example, the distance 2–1 between the two brakes, the thickness of the belt, the initial winding radius of the spiral, etc., there is obtained the law:

$$\alpha = f(x)$$

connecting the angle of rotation $\alpha$ of the brakes with the distance travelled $x$ ($\alpha$ being the unwinding angle of the drums from the beginning of the corresponding braking to the engagement of the aircraft in the net).

The angular speed of the brakes is then expressed by the relation:

$$\omega = f'_x \dot{x}$$

The rate of deceleration of an aircraft with a given mass M being engaged at a speed $\dot{x}$ is obtained by writing that the energy lost by the aircraft is equal at every instant to the energy absorbed by the two brakes, namely:

$$d(\tfrac{1}{2} M \dot{x}^2) = -2C \, d\alpha$$

in which $C = k(x)\omega^2$ which, after the development of the above equations, permits the law of deceleration to be found:

$$\ddot{x} = -2\frac{\dot{x}_0^2}{M} k_{(x)} f'_{(x)}{}^3 e^{-\tfrac{4}{M} \int_0^x k(x) f'_x{}^3 dx}$$

This equation clearly shows that if the function $\alpha = f(x)$ is previously determined, it is possible to obtain a law $k(x)$ for regulating the brakes in such manner as to obtain a deceleration $\ddot{x}$ which is as constant as possible for an aircraft of mass M.

Under these conditions, the brake will be given a variable braking coefficient following a pre-determined law as a function of the position of the aircraft, by inserting in the coupling a regulating device such as a mechanical or electrical cam calculated in such manner that a position of the aircraft will correspond to a definite position of the regulating screens of the brakes which gives the coefficient $k$ corresponding to the law $k(x)$ deduced from the above equation. There can thus be obtained a braking force which is almost constant, and a deceleration curve of the form A″ which comes very close to the ideal deceleration curve CD, especially over the portion EA″F of its outline.

The deceleration law as determined above remains valid for aircraft of the same mass, at speeds of approach different from that selected for its calculation.

In particular, the braking distance will remain the same and the values of deceleration will be proportional to the square of the speed of approach. It will therefore be necessary to select a speed of approach at least equal to the maximum speed of approach for the calculation of the braking and for the determination of the braking system and of the law of deceleration.

Aircraft of different masses which may approach would be braked over a longer travel and with lower decelerations if their mass is greater than the reference mass, and over a shorter travel and with higher decelerations if their mass is lower.

By suitable calculation of the cam inserted in the coupling between the aircraft and the brake-regulating device, it is however possible to obtain, for aircraft of different masses, deceleration curves appropriate to each aircraft, differing from the optimum curve A″, but remaining within acceptable limits of the stopping distance and deceleration, which are substantially improved as compared with those which can be obtained without regulation.

According to the invention, it is possible to obtain an optimum law of deceleration close to the maximum of the ideal curve at constant deceleration, for aircraft of different masses and varying speeds of approach, by combining the method of regulation of the brakes according to the invention as a function of the position of the aircraft, with the method forming the object of French Patent No. 1,408,183 of Jan. 29, 1964 in the names of the present applicants and the Société Francaise Aèronautique Maritime for "A braking device" in which the adaptation of the value of the constant braking force applied to the aircraft, as a function of its mass and its initial speed, is effected by regulation of the braking torque by a regulating device which applies a reference law as a function of the position and of the corresponding instantaneous speed of the aircraft.

In this combination of the two methods, the method in accordance with the present invention will act on the brake-regulating members so as to vary the minimum and maximum limits of opening of the regulating screens as a function of the position of the aircraft, the effective regulation of the opening of the screens being carried out discontinuously, fully or not at all, from one of these limits to the other, in dependence on the parameters of instantaneous speed and position of the aircraft, in accordance with French Patent No. 1,408,183 referred to above.

The arrangements according to the invention are also applicable to eddy-current brakes having a torque which varies as a function of their speed of rotation, in which, according to the invention, action is taken on the electrical excitation of the brake.

The advantages and characteristic features of the invention will furthermore be brought out in the description which follows below of forms of construction chosen by way of example, reference being made to the accompanying drawings, in which.

Figure 1:
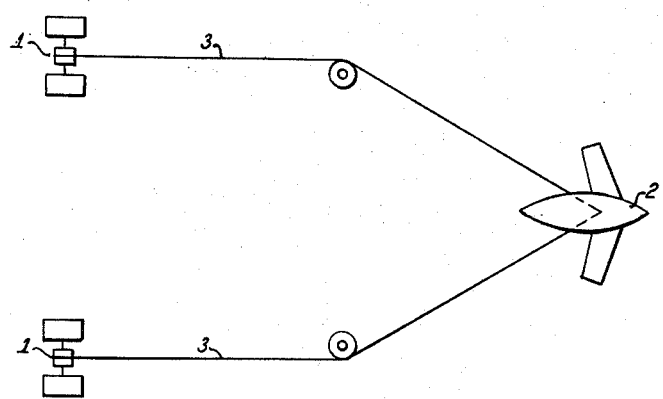
FIG. 1 is a diagrammatic view in plan of a braking installation for aircraft on a runway by means of hydraulic brakes.

There is shown in FIG. 1 a conventional braking device for an aircraft on a runway, constituted by two braking systems 1 comprising hydraulic brakes connected by a belt 3 which is engaged by the aircraft 2 to be braked.

Figure 3:
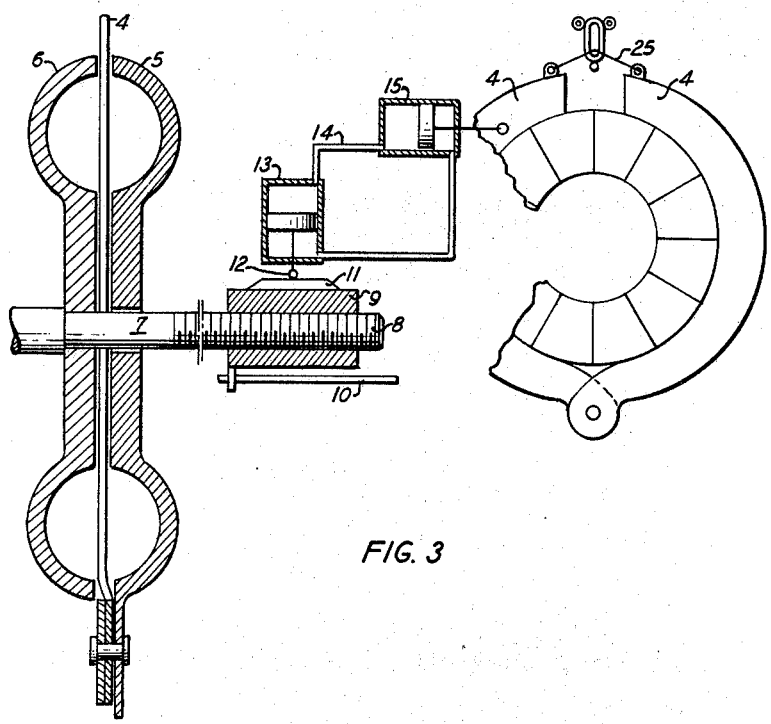
FIG. 3 is a diagrammatic view of an arrangement according to the invention.

There is shown in FIG. 3 a coupling system between the position of the aircraft on its braking travel and the regulation of the hydraulic brakes of FIG. 1, that is to say between the position $x$ of the aircraft on the track and the degree of opening of the regulation screens 4 of each brake.

Each hydraulic brake comprises a stator 5 and a rotor 6 mounted on a shaft 7 rigidly fixed to the winding drum of the braking cable.

A screw 8, driven by the shaft 7 causes axial displacement of a nut 9 which comprises a guiding rail 10.

Under these conditions, the axial displacement of the nut is a function of the position $x$ of the aircraft on the runway, and a cam 11 rigidly fixed to the nut, shown diagrammatically and having a suitably calculated profile, causes the movement, following a pre-determined law, of a push-rod 12 which controls a servo-motor 13 which actuates, through the intermediary of a hydraulic circuit 14, a servo-motor 15 directly operating the movement of one of the screens 4 which ensure by their degree of opening, the regulation of the braking torque of the brake.

The movement of the other screen 4 may be effected by a simple coupling device which effects at the same time the synchronization of the movement of the two screens, formed for example by a triangulation system 25 which couples them together.

Figure 2:
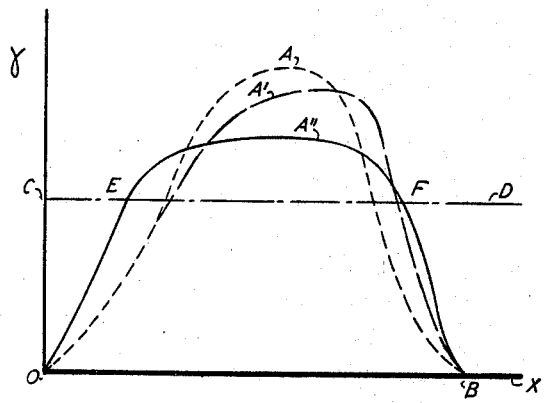
FIG. 2 shows deceleration curves of an aircraft during the course of braking on a runway, following several methods of regulation.

This simple mechanical system makes it possible to obtain automatically a braking coefficient which varies according to a determined law which is solely a function of the parameter of position of the aircraft on the runway, and it is thus possible in particular to obtain a practically constant braking torque and a deceleration having the form of the curve A″ of FIG. 2, which is close to the ideal curve of constant deceleration.

Aircraft of the same mass arriving at different speeds of approach will be braked over the same distance OB, the deceleration being more or less high depending on whether the aircraft approaches at a more or less high speed.

Under these conditions, there must be provided a braking distance OB which is sufficient for the maximum approach speeds of the aircraft, taking into account the maximum permissible deceleration.

Figure 4:
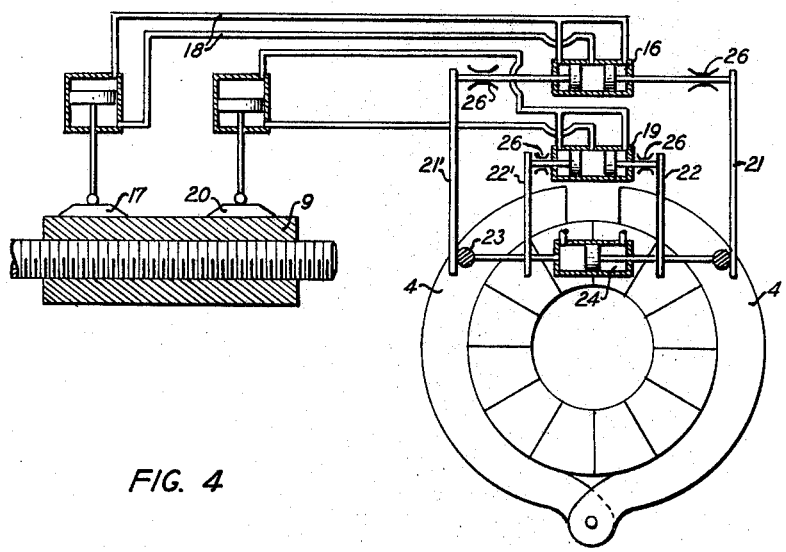
FIG. 4 is a diagrammatic view of an arrangement according to the invention, applied in combination with another system of regulation of the brakes.

FIG. 4 shows a diagram for the purpose of regulating the braking torque by utilizing the method according to the invention in combination with the method of regulation corresponding to the above-mentioned French Patent No. 1,408,183, making use of a regulating device which is responsive simultaneously to the position of the aircraft and to its instantaneous speed, enabling the braking to be effected of aircraft of different weights and speeds under optimum conditions of deceleration.

There can be seen from FIG. 4, a servo-motor 16 controlled through the intermediary of a hydraulic circuit 18 by the movement of a cam 17 rigidly fixed to the nut 9 of FIG. 3, the movement of which is a function of the position of the aircraft, and a second servo-motor 19 operated by the movement of a cam 20 rigidly fixed to the same nut 9.

These two servo-motors 16 and 19 continuously position respectively the movable stops 21, 21′ and 22, 22′, which respectively regulate the maximum and minimum limits of travel for the opening of the screens 4 for regulating the brake, since the spindles 23 on which the servo-motor 24 actuating the screens is connected come into contact with these abutments at the end of their travel. The servo-motor 24 is connected in a known manner to a suitable source of hydraulic fluid and its operation is controlled as is usual in the art, as for example, by remote control.

The regulating device responsive to the position and to the instantaneous speed of the aircraft acts fully or not at all, following an order on the servo-motor 24 which operates the screens 4, so as to put the latter either in the maximum opening position in contact with the abutments 21, 21′ of the maximum opening travel, or in the minimum opening position, in contact with the minimum opening travel abutments 22, 22′.

There may be provided a simple system, similar to the triangulation device 25 of FIG. 3, in order to ensure synchronization of movement between the two screens 4, between the two moving abutments 21, 21′, and between the two movable abutments 22, 22′.

The invention is not limited to the forms of construction described and shown, but covers all alternative forms.

I claim:
1. In a braking system, the combination of a braking belt for slowing down aircraft on a runway, a drum for such belt, a rotary fluid brake coupled to said drum and having means movable to vary the fluid flow between the stator and rotor thereof and thereby modify the braking coefficient of such brake, and means operable automatically to control the operation of said movable means and comprising means drivenly connected to said drum and movable by the latter to positions which are a function of the travel of the aircraft along the runway, means associated with said movable means for controlling the movements thereof, and means coupling said driven means to said associated means, said driven means being constructed and arranged to impart to said associated means through said coupling means movements corresponing to the positions of the aircraft on the runway and comprising a screw driven by said drum, a nut threadedly engaging said screw and axially displaceable on the latter when said screw is rotated by the drum, first cam means mounted on said screw and movable longitudinally in parallelism with the axis of rotation of said screw, and second cam means coacting with said first cam means and controlling the operation of said coupling means.

2. In a braking system as defined in claim 1, in which said first cam means comprises a pair of cams mounted on said nut, and in which said second cam means comprises a pair of cam followers each of which coacts with one of said cams, and in which said coupling means comprises a first coupling system controlled by the movements of one of said cam followers and a second coupling system controlled by the movements of the other of said cam followers.

3. In a braking system, the combination of a braking belt for slowing down aircraft on a runway, a drum for such belt, a rotary fluid brake coupled to said drum and having means movable to vary the fluid flow between the stator and rotor thereof and thereby modify the braking coefficient of such brake, said movable means comprising a pair of semicylindrically-shaped regulating screens pivotally connected at one end and movable toward and away from each other about the axis of such pivotal connection, and means operable automatically to control the operation of said movable means and comprising means drivenly connected to said drum and movable by the latter to positions which are a function of the travel of the aircraft along the runway, means associated with said movable means for controlling the movements thereof, and means coupling said driven means to said associated means, said associated means being directly connected to said movable means and comprising a pivotal connection between the free end of one of said screens and said coupling means, said driven means being constructed and arranged to impart to said associated means through said coupling means movements corresponding to the positions of the aircraft on the runway and through said coupling and associated means, moving said movable means to positions corresponding to the positions of the aircraft on the runway and such that the brake will be given variable predetermined braking coefficients which are a function of such positions of the aircraft on the runway.

4. In a braking system, the combination of a braking belt for slowing down aircraft on a runway, a drum for such belt, a rotary fluid brake coupled to said drum and having means movable to vary the fluid flow between the stator and rotor thereof and thereby modify the braking coefficient of such brake, and means operable automatically to control the operation of said movable means and comprising means drivenly connected to said drum and movable by the latter to positions which are a function of the travel of the aircraft along the runway, means associated with said movable means for controlling the movements thereof, and means coupling said driven means to said associated means, said driven means being constructed and arranged to impart to said associated means through said coupling means movements corresponding to the positions of the aircraft on the runway, said associated means comprising means for actuating said movable means and means for controlling the range of movement of said movable means, including first movable stop means connected to said coupling means and defining the outer limit of the range of movement of said movable means, and second movable stop means connected to said coupling means and defining the inner limit of the range of movement of said movable means, said first and second movable stop means being movable relative to each other by said driven means and said coupling means, said coupling means connecting said driven means to said range controlling means, said range controlling means being operable on said movements of said driven means to modify the ranges of movement of said movable means to correspond with the positions of the aircraft on the runway, said first movable stop means comprising a pair of stop members movable toward and away from each other by said coupling means, said second stop means comprising a pair of stop members movable toward and away from each other by said coupling means and each of which is paired with one of the stop members of said first stop means, said movable means comprising a pair of movable members, and said actuating means comprising a pair of connecting members mounted on said movable members and each located between a pair of said paired stop members and limited in its movements by the latter.

References Cited

UNITED STATES PATENTS

| | | | |
|---|---|---|---|
| 2,267,852 | 12/1941 | Walker | 188—90 |
| 2,843,228 | 7/1958 | Wysor | 244—110 X |
| 2,969,856 | 1/1961 | Dow | 244—110 X |
| 3,072,222 | 1/1963 | Kugel et al. | 188—90 |
| 3,181,819 | 5/1965 | Hayes | 244—110 X |

MILTON BUCHLER, Primary Examiner

PAUL E. SAUBERER, Assistant Examiner

U.S. Cl. X.R.

188—90